US011643945B2

(12) United States Patent
Kamada

(10) Patent No.: US 11,643,945 B2
(45) Date of Patent: May 9, 2023

(54) INTERNAL COMBUSTION ENGINE DIAGNOSING DEVICE

(71) Applicant: ISUZU MOTORS LIMITED, Tokyo (JP)

(72) Inventor: Naoaki Kamada, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 81 days.

(21) Appl. No.: 17/280,417

(22) PCT Filed: Sep. 25, 2019

(86) PCT No.: PCT/JP2019/037491
§ 371 (c)(1),
(2) Date: Mar. 26, 2021

(87) PCT Pub. No.: WO2020/067110
PCT Pub. Date: Apr. 2, 2020

(65) Prior Publication Data
US 2021/0340880 A1    Nov. 4, 2021

(30) Foreign Application Priority Data
Sep. 28, 2018   (JP) ............................. JP2018-184212

(51) Int. Cl.
*F01D 21/14*    (2006.01)
*F01D 17/16*    (2006.01)
(Continued)

(52) U.S. Cl.
CPC ........... *F01D 21/14* (2013.01); *F01D 17/165* (2013.01); *F02C 6/12* (2013.01); *F02D 41/0007* (2013.01);
(Continued)

(58) Field of Classification Search
CPC .......... F01D 21/14; F01D 17/165; F02C 6/12; F05D 2220/40; F05D 2250/90;
(Continued)

(56) References Cited

U.S. PATENT DOCUMENTS 6,250,145 B1 * 6/2001 Honold .................. F02B 39/16
73/114.77
2002/0194844 A1   12/2002 Shiratani et al.
(Continued)

FOREIGN PATENT DOCUMENTS

CN       103080500 A       5/2013
CN       104895684 A       9/2015
(Continued)

OTHER PUBLICATIONS

International Search Report and Written Opinion for related PCT App No. PCT/JP2019/037491 dated Dec. 17, 2019, 9 pgs. (partial translation).
(Continued)

*Primary Examiner* — Loren C Edwards
(74) *Attorney, Agent, or Firm* — Procopio, Cory, Hargreaves & Savitch LLP

(57) ABSTRACT

An aspect of the present disclosure provides a diagnosis device for an internal combustion engine. The internal combustion engine 1 includes a variable geometry type turbocharger 14, and the turbocharger includes a variable vane 28, a link mechanism configured to operate the variable vane, and an actuator 29 configured to drive the link mechanism. The diagnosis device includes a control unit 100 configured to control an opening degree of the variable vane by controlling the actuator. The control unit determines that an abnormality has occurred in the link mechanism of the turbocharger when an operating time of the internal combustion engine in a predetermined operating region exceeds
(Continued)

a predetermined upper limit value and a differential pressure between a target boost pressure determined according to an operating state of the internal combustion engine and an actual boost pressure exceeds a predetermined upper limit value.

3 Claims, 4 Drawing Sheets

(51) Int. Cl.
*F02C 6/12* (2006.01)
*F02D 41/00* (2006.01)
*F02D 41/22* (2006.01)
*F02B 37/24* (2006.01)

(52) U.S. Cl.
CPC ............ *F02D 41/221* (2013.01); *F02B 37/24* (2013.01); *F05D 2220/40* (2013.01); *F05D 2250/90* (2013.01); *F05D 2260/57* (2013.01); *F05D 2260/80* (2013.01); *F05D 2270/3015* (2013.01); *F05D 2270/331* (2013.01)

(58) Field of Classification Search
CPC ............ F05D 2260/57; F05D 2260/80; F05D 2270/3015; F05D 2270/331; F02D 41/0007; F02D 41/221; F02B 37/22; F02B 37/225; F02B 37/24; F02B 39/16; Y02T 10/40
See application file for complete search history.

(56) References Cited

U.S. PATENT DOCUMENTS

| | | | |
|---|---|---|---|
| 2003/0084886 A1* | 5/2003 | Akao | ...................... F02D 41/22 60/605.1 |
| 2004/0144086 A1 | 7/2004 | Otake et al. | |
| 2005/0252210 A1 | 11/2005 | Shiraishi et al. | |
| 2010/0028142 A1 | 2/2010 | Hashimoto et al. | |
| 2011/0110767 A1* | 5/2011 | Castan | .................. F01D 17/165 415/230 |
| 2013/0255648 A1 | 10/2013 | Yamamoto et al. | |
| 2015/0252720 A1 | 9/2015 | Marlett et al. | |

FOREIGN PATENT DOCUMENTS

| | | | | |
|---|---|---|---|---|
| EP | 0899437 | A2 | 3/1999 | |
| JP | H11-210483 | A | 8/1999 | |
| JP | 2003003831 | A | 1/2003 | |
| JP | 2004232496 | A | 8/2004 | |
| JP | 2005273568 | A | 10/2005 | |
| JP | 2006-514191 | T | 4/2006 | |
| JP | 4019483 | B2 * | 12/2007 | ............. F02B 37/24 |
| JP | 2008095541 | A | 4/2008 | |
| JP | 2014009590 | A | 1/2014 | |
| JP | 2016205350 | A | 12/2016 | |
| JP | 2017025755 | A | 2/2017 | |

OTHER PUBLICATIONS

National Intellectual Property Administration of the People's Republic of China, The First Office Action, Application No. 201980064123.2, dated Sep. 5, 2022, in 16 pages.

* cited by examiner

INTERNAL COMBUSTION ENGINE DIAGNOSING DEVICE

CROSS-REFERENCE TO RELATED APPLICATIONS

This application is a U.S. National Stage entry of PCT Application No: PCT/JP2019/037491 filed Sep. 25, 2019, which claims priority to Japanese Patent Application No. 2018-184212 filed Sep. 28, 2018, the contents of which are incorporated herein by reference.

TECHNICAL FIELD

The present disclosure relates to a diagnosis device for an internal combustion engine.

BACKGROUND ART

For example, in an internal combustion engine for a vehicle, known is a variable geometry type turbocharger (charger) having a plurality of variable vanes at an inlet of a turbine. The turbocharger includes a link mechanism for operating the plurality of variable vanes at the same time, and an actuator for driving the link mechanism. By controlling the actuator, opening degrees of the variable vanes are controlled, and thus, a boost pressure is controlled.

CITATION LIST

Patent Literature

Patent Literature 1: JP-A-2016-205350

SUMMARY OF INVENTION

Technical Problem

In the internal combustion engine, it is turned out that when the internal combustion engine is operated in a specific operating region, deterioration of the link mechanism is promoted, as compared to a case where the internal combustion engine is operated in other operating regions. It is also turned out that when an operating time in the specific operating region exceeds an upper limit value, the link mechanism becomes abnormal, so that a malfunction such as a problem that a desired boost pressure cannot be generated occurs.

It is preferable to promptly detect the abnormality of the link mechanism and to warn a user to early solve the same.

The present disclosure has been made in view of the above situations, and an object thereof is to provide a diagnosis device for an internal combustion engine capable of promptly detecting an abnormality of a link mechanism of a variable geometry type turbocharger.

Solution to Problem

An aspect of the present disclosure provides a diagnosis device for an internal combustion engine, the internal combustion engine including a variable geometry type turbocharger, and the turbocharger including a variable vane, a link mechanism configured to operate the variable vane, and an actuator configured to drive the link mechanism, the diagnosis device including:
a control unit configured to control an opening degree of the variable vane by controlling the actuator,
in which the control unit determines that an abnormality has occurred in the link mechanism of the turbocharger when an operating time of the internal combustion engine in a predetermined operating region exceeds a predetermined upper limit value and a differential pressure between a target boost pressure determined according to an operating state of the internal combustion engine and an actual boost pressure exceeds a predetermined upper limit value.

Preferably, the predetermined operating region is an operating region where a number of rotations of the internal combustion engine is huge and a load of the internal combustion engine is low.

Preferably, the link mechanism includes a rotation member and a rotatable lever engaged to the rotation member and coupled to the rotation member, and the abnormality of the link mechanism is abnormal wear at a contact pan between the rotation member and the lever.

Advantageous Effects of Invention

According to the present disclosure, it is possible to promptly detect an abnormality in the link mechanism of the variable geometry type turbocharger.

DESCRIPTION OF EMBODIMENTS

Hereinbelow, an embodiment of the present disclosure will be described with reference to the accompanying drawings. Note that, it should be understood that the present disclosure is not limited to the embodiment.

Figure 1:
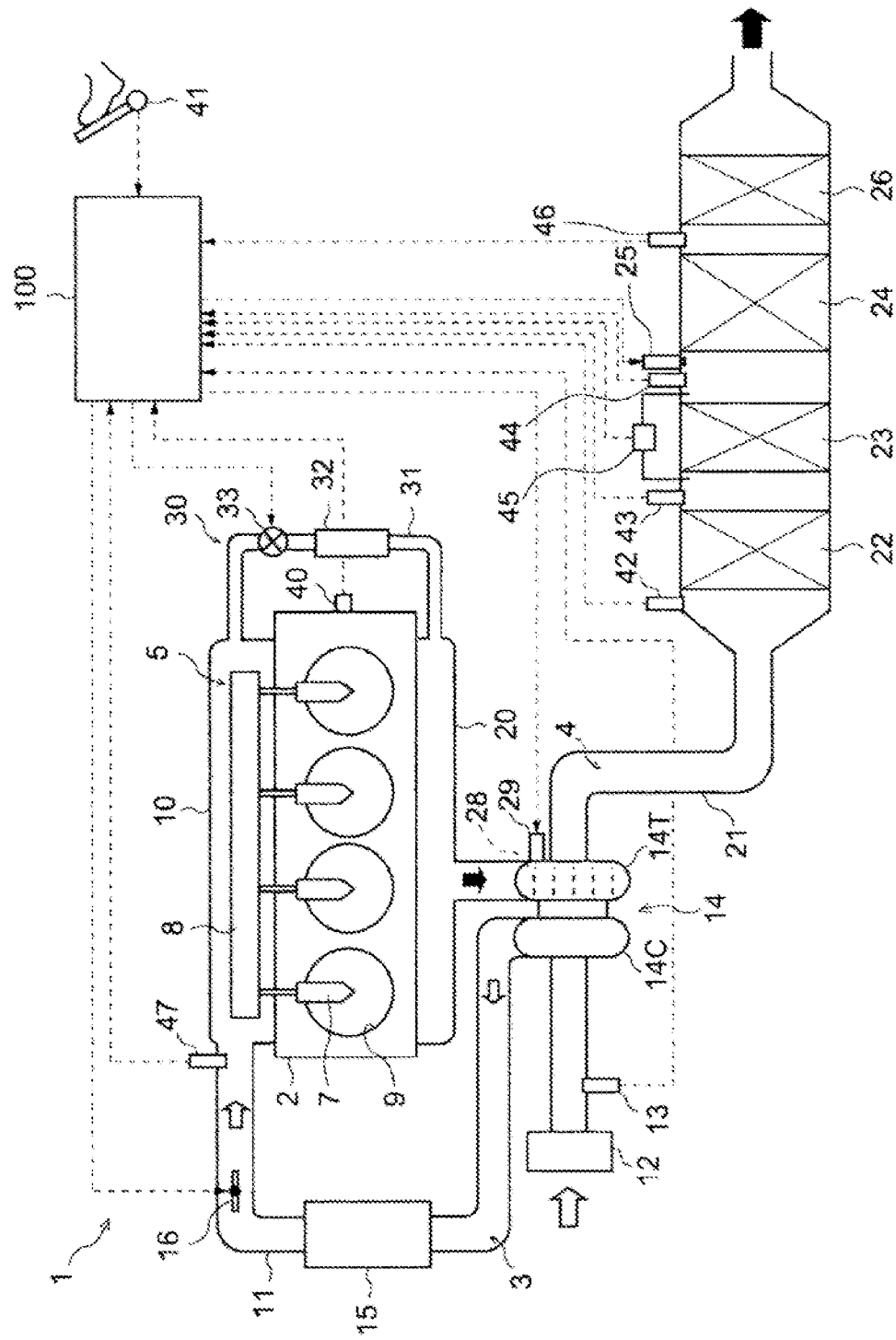
FIG. 1 is a schematic view depicting a configuration of an embodiment of the present disclosure.

FIG. 1 is a schematic view depicting a configuration of an embodiment of the present disclosure. An internal combustion engine (engine) 1 is a multicylinder engine mounted on a vehicle (not shown). In the present embodiment, the vehicle is a large-sized vehicle such as a truck, and the engine 1 as a vehicle power source mounted on the vehicle is an in-line four-cylinder diesel engine. However, the types, forms, uses and the like of the vehicle and the internal combustion engine are not particularly limited. For example, the vehicle may be a small-sized vehicle such as a car, and the engine 1 may be a gasoline engine.

The engine 1 includes an engine body 2, an intake passage 3 and an exhaust passage 4 connected to the engine body 2, a turbocharger 14, and a fuel injection device 5. The engine body 2 includes structural components such as a cylinder head, a cylinder block, and a crankcase, and movable components such as a piston, a crankshaft, and a valve which are accommodated in the structural components.

The fuel injection device 5 is a common rail type fuel injection device, and has fuel injection valves, i.e., injectors 7 provided to each of the cylinders, and a common rail 8 connected to the injectors 7. The injector 7 is configured to directly inject fuel into a cylinder 9, i.e., into a combustion chamber. The common rail 8 is configured to retain fuel, which is injected from the injectors 7, in a high pressure state.

The intake passage 3 is mainly defined by an intake manifold 10 connected to the engine body 2 (particularly, a cylinder head) and an intake pipe 11 connected to an upstream end of the intake manifold 10. The intake manifold 10 is configured to distribute and supply an intake air sent from the intake pipe 11 to an intake port of each cylinder. The intake pipe 11 is provided with an air cleaner 12, an air flow meter 13, a compressor 14C of the turbocharger 14, an intercooler 15, and an electronically controlled intake throttle valve 16 in corresponding order from an upstream side. The air flow meter 13 is a sensor for detecting an intake air amount per unit time of the engine 1, i.e., a flow rate of an intake air, and is also referred to as a MAF sensor or the like.

The exhaust passage 4 is mainly defined by an exhaust manifold 20 connected to the engine body 2 (particularly, a cylinder head) and an exhaust pipe 21 connected on a downstream side of the exhaust manifold 20. The exhaust manifold 20 is configured to collect an exhaust gas sent from an exhaust port of each cylinder. A turbine 14T of the turbocharger 14 is provided to the exhaust pipe 21 or between the exhaust manifold 20 and the exhaust pipe 21. The exhaust pipe 21 on a further downstream side than the turbine 14T is provided with an oxidation catalyst 22, a particulate filter (DPF) 23, a selective reduction type NOx catalyst (SCR) 24 and an ammonia oxidation catalyst 26 in corresponding order from an upstream side. The exhaust passage 4 on an upstream side, particularly, in the vicinity of an inlet of the NOx catalyst 24 is provided with an addition valve 25 for adding urea water as a reducing agent.

The turbocharger 14 is a variable geometry type turbocharger. The turbocharger 14 has a plurality of variable vanes 28 for varying an opening degree of a nozzle at the inlet of the turbine, a link mechanism (which will be described later) for operating the variable vanes 28 at the same time, and an actuator, i.e., a turbo actuator 29 for driving the link mechanism. The turbo actuator 29 of the present embodiment is constituted by an electric motor but may be constituted by a pneumatic actuator other than the electric motor, for example.

The engine 1 also has an EGR device 30. The EGR device 30 has an EGR passage 31 for refluxing a part (referred to as 'EGR gas') of an exhaust gas in the exhaust passage 4 (particularly, in the exhaust manifold 20) into the intake passage 3 (particularly, into the intake manifold 10), an EGR cooler 32 for cooling the EGR gas flowing in the EGR passage 31, and an EGR valve 33 for regulating a flow rate of the EGR gas.

In the present embodiment, an electronic control unit (hereinbelow, referred to as 'ECU') 100 constituting a control unit or a controller is provided. The ECU 100 includes a CPU, a ROM, a RAM, input/output ports, a storage device and the like. The ECU 100 is configured and programmed to control the injectors 7, an intake throttle valve 16, the addition valve 25, the EGR valve 33, and the turbo actuator 29.

In the present embodiment, a rotating speed sensor 40 for detecting a rotating speed of the engine (specifically, rotation per minute (rpm)), and an accelerator opening degree sensor 41 for detecting an accelerator opening degree are provided, in addition to the air flow meter 13. In addition, exhaust gas temperature sensors 42, 43, 44 and 46 for detecting exhaust gas temperatures (inlet gas temperature) on upstream sides or in the vicinity of inlets of the oxidation catalyst 22, the DPF 23, the NOx catalyst 24 and the ammonia oxidation catalyst 26, and a differential pressure sensor 45 for detecting a differential pressure between exhaust gas pressures on upstream and downstream sides of the DPF 23 are provided.

A boost pressure sensor 47 for detecting a supercharging pressure or a boost pressure is also provided. In the present embodiment, the boost pressure sensor 47 is provided to the intake pipe 11 on a downstream side of the intake throttle valve 16 and immediately in front of the intake manifold 10. However, the provision position is arbitrary. For example, the boost pressure sensor 47 may be provided to the intake manifold 10. Output signals of the sensors are transmitted to the ECU 100.

The diagnosis device of the present embodiment includes at least the ECU 100, and is configured to detect an abnormality of the link mechanism of the turbocharger 14. This is described in detail, in the below.

Figure 2:
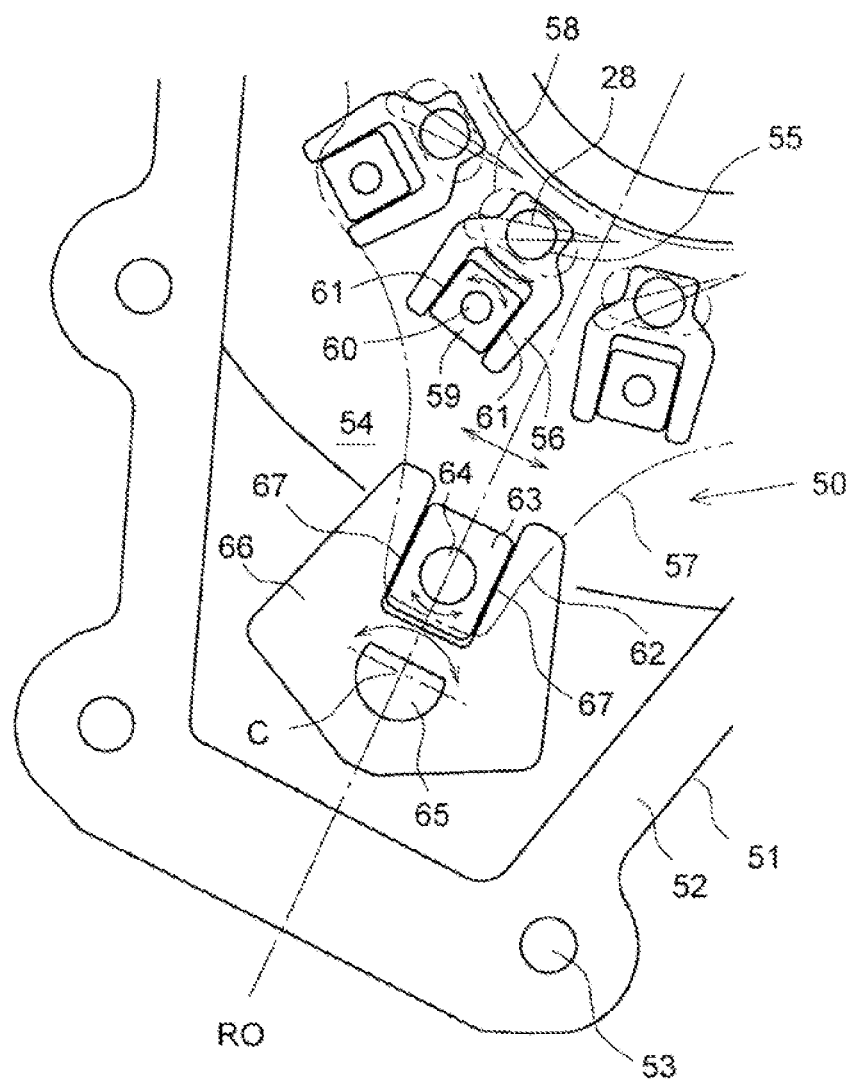
FIG. 2 is a front view depicting a configuration of the link mechanism.

FIG. 2 depicts a configuration of the link mechanism 50 of the turbocharger 14. As well known, the turbocharger 14 has a turbine housing configured to rotatably accommodate a turbine wheel, and a center housing joined to the turbine housing and configured to rotatably support a turbine shaft. In FIG. 2, only the center housing 51 in a state where the housings are separated from each other is shown. A reference sign 52 indicates a fastening surface of the center housing 51 to the turbine housing. As can be seen from this, FIG. 2 depicts the link mechanism 50, as seen from the turbine-side in a direction (a thickness direction of the drawing sheet of FIG. 2) of a central axis (i.e., a turbine axis) of the turbine shaft. A reference sign RO indicates a radius line extending from the turbine axis on a right upper side outside FIG. 2. The fastening surface 52 is provided with a plurality of screw holes 53 to which bolts (not shown) are fastened when fastening the turbine housing to the center housing 51 by the bolts. The link mechanism 50 is accommodated in a link mechanism accommodation chamber 54 between the turbine housing and the center housing 51.

The variable vanes 28 are provided with equal intervals around the turbine axis. The variable vanes 28 are arranged in nozzle passages (not shown) in the turbine housing so as to surround the turbine wheel. One end of a vane shaft 55 is fixed to the variable vane 28. The vane shaft 55 is rotatably supported with being inserted in a shaft hole (not shown) of a nozzle back plate fixed to the center housing 51 and defining the nozzle passage. A base end of a vane arm (so-called crab claw) 56 serving is a first arm having a bifurcated tip end is fixed to the other end of the vane shaft 55. Thereby, the variable vane 28, the vane shaft 55 and the vane arm 56 can rotate around a center of the vane shaft 55 integrally.

In order to generate the rotation, a ring plate 57 configured to go around the turbine axis is attached to the center housing 51 so as to be rotatable around the turbine axis. The ring plate 57 is accommodated in the link mechanism accommodation chamber 54. In FIG. 2, the ring plate 57 is shown transparently. Actually, the variable vane 28 is arranged on a surface-side (a front side in the thickness direction of the drawing sheet) of the ring plate 57, and the vane arm 56 is arranged on a backside (an inner side in the thickness direction of the drawing sheet) of the ring plate 57. The vane shaft 55 is slidably inserted in a long hole 58 formed in the ring plate 57 and extending circumferentially.

A first rotation member is rotatably attached to a backside part of the ring plate 57. In the present embodiment, the first rotation member is a polygonal, specifically, quadrangular, and more specifically, square rotation piece (so-called top) 59. The rotation piece 59 is attached to the ring plate 57 via a piece shaft 60, and can rotate around a center of the piece shaft 60.

The vane arm 56 is engaged and coupled to the rotation piece 59. That is, the bifurcated lip end portion of the vane arm 56 sandwiches two parallel side surfaces of the rotation piece 59, and is thus engaged to the rotation piece 59. The bifurcated lip end portion of the vane arm 56 and the two side surfaces of the rotation piece 59 can contact each other, and form two contact parts 61. The contact part 61 has a slight clearance in terms of dimensions. However, when an input from one of the vane arm 56 and the rotation piece 59 to the other occurs, the clearance disappears and the vane arm 56 and the rotation piece 59 come into contact with each other.

On the other hand, an operation part 62 extending radially outward is formed at one circumferential place of the ring plate 57, and a second rotation member is rotatably attached to a backside part of the operation part 62. In the present embodiment, the second rotation member is a polygonal, specifically, quadrangular, and more specifically, square operation rotation piece (so-called segment) 63. The operation rotation piece 63 is attached to the operation part 62 via an operation rotation piece shaft 64, and can rotate around a center of the operation rotation piece shaft 64. Note that, the shown radius line RO passes through the center of the operation rotation piece shaft 64.

An operation shaft 65 is arranged on a radially outer side of the operation rotation piece shaft 64 based on the turbine axis and on the same radius line RO. The operation shaft 65 is inserted through a shaft hole (not shown) of the center housing 51 and is rotatably supported. A base end of an operation arm (so-called crab claw) 66 as a second arm having a bifurcated lip end is fixed to one end of the operation shaft 65 located inside the center housing 51. The operation arm 66 is larger than the vane arm 56. On the other hand, a base end of an actuator lever (not shown) whose tip end is coupled to the turbo actuator 29 is fixed to the other end of the operation shaft 65 located outside the center housing 51. Thereby, the operation arm 66, the operation shaft 65 and the actuator lever can rotate around a center C of the operation shaft 65 integrally.

The operation arm 66 is also engaged and coupled to the operation rotation piece 63. That is, the bifurcated lip end portion of the operation arm 66 sandwiches two parallel side surfaces of the operation rotation piece 63 and is thus engaged to the operation rotation piece 63. The bifurcated lip end portion of the operation arm 66 and the two side surfaces of the operation rotation piece 63 can contact each other, and form two contact parts 67. The contact part 61 has a slight clearance in terms of dimensions. However, when an input from one of the operation arm 66 and the operation rotation piece 63 to the other occurs, the clearance disappears and the operation arm 66 and the operation rotation piece 63 come into contact with each other.

According to the configuration of the link mechanism 50, when the turbo actuator 29 is actuated so as to change the opening degree of the variable vane 28, the actuation is transmitted to the operation arm 66 through the actuator lever and the operation shaft 65, thereby rotating the operation arm 66. This rotation causes the ring plate 57 to rotate around the turbine axis. At this time, in order to allow the rotations, the operation rotation piece 63 is rotated in a reverse direction to the rotating direction of the operation arm 66. During the rotations, the contact pans 67 of the operation arm 66 and the operation rotation piece 63 come into contact or come into close contact, so that a drive force is transmitted from the operation arm 66 to the operation rotation piece 63.

The rotation of the ring plate 57 causes the rotation piece 59 to circumferentially move around the turbine axis. Thereby, a relative position of the rotation piece 59 to the vane shaft 55 is changed, so that the rotation piece 59 causes the vane arm 56 to rotate around the vane shaft 55. Thereby, the variable vane 28 rotates around the vane shaft 55, so that the opening degree of the variable vane 28 is changed. During the rotation of the vane arm 56, die rotation piece 59 also rotates around the piece shaft 60 in an opposite direction to the rotating direction of the vane arm 56. During the rotations of the vane arm 56 and the rotation piece 59, the contact parts 61 of the vane arm 56 and the rotation piece 59 come into contact or come into close contact, so that the drive force is transmitted from the rotation piece 59 to the vane arm 56.

In the engine 1, it is turned out that when the engine 1 is operated in a specific operating region, deterioration of the link mechanism 50 is promoted, as compared to a case where it is operated in other operating regions. It is also turned out that when an operating time in the specific operating region exceeds an upper limit value, the link mechanism 50 becomes abnormal, so that a malfunction such as a problem that a desired boost pressure cannot be generated occurs.

This is described hereinafter. First, a part where deterioration is promoted when operated in the specific operating region is the contact parts 67 of the operation arm 66 and the operation rotation piece 63 of the link mechanism 50. The specific operating region is an operating region R on a large rotation number side and low load side in which an engine rotation number Ne is large and an engine load (specifically, a target fuel injection amount Q) is low, as shown in FIG. 3C.

The operation arm 66 and the operation rotation piece 63 are made of a relatively rigid material because they transmit a high drive force against a drive reaction force received from the exhaust gas by the plurality of variable vanes 28. During tire rotations of the operation arm 66 and the operation rotation piece 63 (i.e., during the change in the variable vane opening degree), a problem does not particularly occur because the contact parts 67 are kept in contact with each other.

However, during stop of the rotations of the operation arm 66 and the operation rotation piece 63, i.e., while the variable vane opening degree is kept constant, the contact parts 67 are in a relatively free state, so that the contact parts 67 rattle and vibrate according to the force received from the exhaust gas by the variable vanes 28. Due to the vibrations, the wear of the contact parts 67 is promoted. It can be seen that the wear occurs particularly dominantly at at least one of end portions (i.e., vicinities of corner portions) of the two side surfaces of the operation rotation piece 63 and corresponding portions of the operation arm 66 to which the end portions come into contact.

On the other hand, when an operating state of the engine changes, the variable vane opening degree also correspondingly changes, so that the vibration problem of the contact parts 67 as described above does not occur. However, when the operating stale of the engine is constant, the variable vane opening degree is also kept constant, so that the vibration problem of the contact parts 67 occur.

According to a test result, it is confirmed that the wear promotion is dominant in the operation region (also referred to as wear promoting region) on the high rotation-side and low load-side. The reason thereof is considered to be that the variable vane opening degree is kept constant in the operating region R in many cases, for example, the operating state of the engine is kept constant by high-speed traveling in many cases.

When the wear of the contact parts 67 is promoted and exceeds an allowable limit, an abnormality, which is abnormal wear of the contact parts 67, occurs. When the abnormality occurs, an actual variable vane opening degree is insufficient as compared to a target variable vane opening degree corresponding to a target boost pressure, so that the boost pressure becomes insufficient. Then, since the fuel injection amount becomes relatively large with respect to the intake air amount, a problem that the combustion gas temperature rises and an amount of NOx generation increases occurs.

As described above, the abnormality of the link mechanism 50 is an abnormal wear of the contact parts 67. In the meantime, since the contact parts 61 of the vane arm 56 and the rotation piece 59 have also a similar configuration, the similar abnormal wear occurs, so that the above-described malfunction may be caused thereby. Therefore, in the present embodiment, the abnormal wear of the contact pans 61 of the vane arm 56 and the rotation piece 59 is also included in the abnormality of the link mechanism 50.

It is preferable to promptly detect the abnormality of the link mechanism 50 and to warn a user to early solve the same. Therefore, in the present embodiment, the abnormality of the link mechanism 50 is promptly detected by a following method.

In the present embodiment, when the operating time of the engine 1 in the wear promoting region R exceeds a predetermined upper limit value and a differential pressure between a target boost pressure determined according to the operating state of the engine 1 and an actual boost pressure exceeds a predetermined upper limit value, the ECU 100 determines that an abnormality has occurred in the link mechanism 50 of the turbocharger 14.

When the operating time in the wear promoting region R reaches a long time, the abnormal wear may occur on the contact parts 67. Therefore, in the present embodiment the slate where the operating time in the wear promoting region R exceeds the predetermined upper limit value is set as a first condition for abnormality determination.

In the meantime, the abnormal wear occurs when the differential pressure between the target boost pressure and the actual boost pressure increases. Therefore, in the present embodiment, the state where the differential pressure between the target boost pressure and the actual boost pressure exceeds the predetermined upper limit value is set as a second condition for abnormality determination.

Particularly, in the present embodiment, the abnormality determination is decided only in a case where both the first condition and the second condition are satisfied. Even when the first condition is satisfied, it cannot be said that the abnormal wear has occurred. The same also applies to the second condition. In the present embodiment, the abnormality determination is performed in a case where the second condition is satisfied on the premise that the first condition is satisfied. Therefore, it is possible to suppress a false diagnosis and to correctly detect the abnormality of the link mechanism 50.

Here, the operating time of the engine 1 in the wear promoting region R includes not only the operating time itself but also a correlation value correlating to the operating time. Examples of the correlation value include an integrated value of a fuel injection amount (particularly, a target fuel injection amount) or in intake air amount.

The differential pressure between the target boost pressure and the actual boost pressure includes not only the differential pressure itself but also a correlation value correlating to the differential pressure. Examples of the correlation value include a feedback term Svfb that is calculated in variable vane opening degree control, which will be described later.

Note that, the shape of the wear promoting region R show in in FIG. 3C is just exemplary, and a variety of shapes except the shown example can be considered. The wear promoting region R is set as appropriate according to a result of an actual test.

Figure 4:
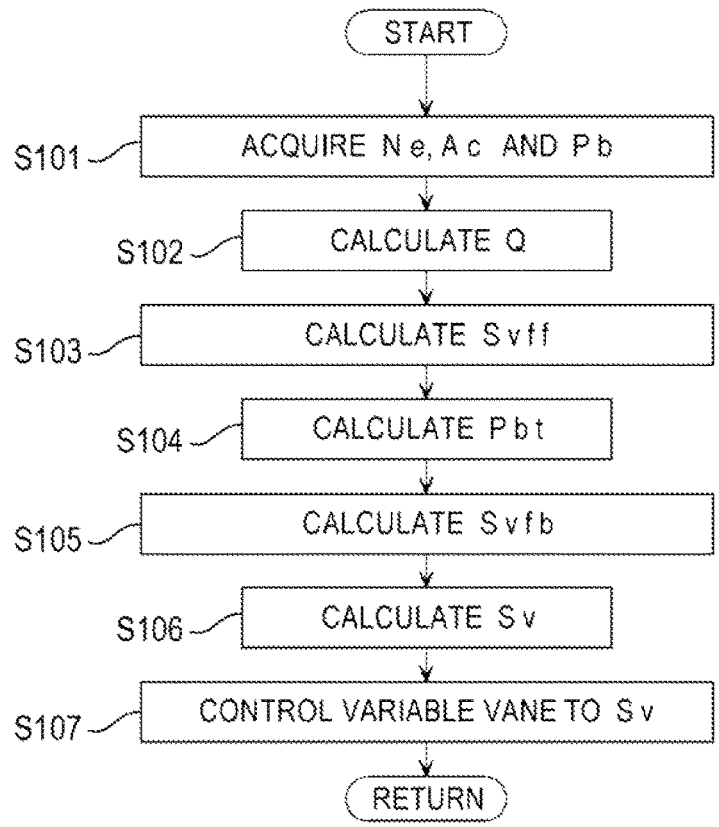
FIG. 4 is a flowchart depicting a control routine of an opening degree of a variable vane.

Subsequently, the control and diagnosis processing of the present embodiment is described. First, the variable vane opening degree control is described with reference to FIG. 4. The shown routine is repeatedly excelled every predetermined calculation cycle τ (for example, 10 msec) by the ECU 100.

In step S101, the ECU 100 acquires values of an engine rotation number Ne, an accelerator opening degree Ac, and a boost pressure Pb detected by the rotating speed sensor 40, the accelerator opening degree sensor 41, and the boost pressure sensor 47, respectively.

Figure 3A:
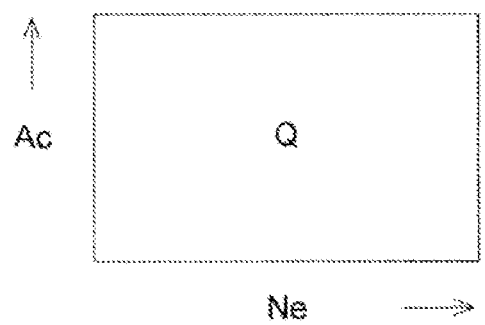
FIG. 3A depicts a map.

In step S102, the ECU 100 calculates a fuel injection amount, specifically, a target fuel injection amount Q as an instructed injection amount to the injectors 7 according to a predetermined map as shown in FIG. 3A, based on the engine rotation number Ne and the accelerator opening degree Ac.

Note that, the engine rotation number Ne, the accelerator opening degree Ac and the target fuel injection amount Q are all engine parameters indicative of the operating slate of the engine. Therefore, the operating state of the engine is defined by at least one of the three engine parameters. In addition, the accelerator opening degree Ac and the target fuel injection amount Q are engine parameters corresponding to the engine load.

Then, in steps S103 to S106, the ECU 100 calculates a target opening degree Sv of the variable vane 28. The target opening degree Sv is calculated by summing a feed forward (F/F) term Svff and a feedback (F/B) term Svfb.

Figure 3B:
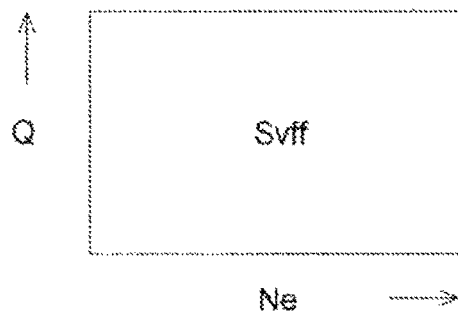
FIG. 3B depicts a map.
Figure 3C:
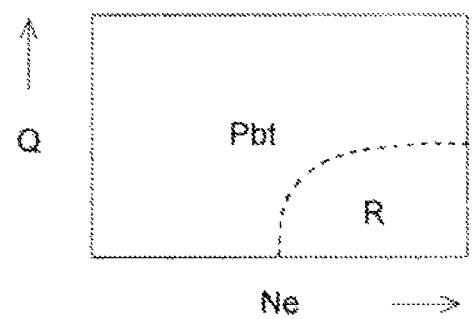

In step S103, the ECU 100 calculates an F/F term Svff according to a predetermined map as shown in FIG. 3B, based on the engine rotation number Ne and the target fuel injection amount Q.

In step S104, the ECU 100 calculates a target boost pressure Pbt according to a predetermined map as shown in FIG. 3C, based on the engine rotation number Ne and the target fuel injection amount Q. Note that, a part shown with the broken line in the map is the wear promoting region R.

In step S105, the ECU 100 calculates an F/B term Svfb, based on a differential pressure between the target boost pressure Pbt and the actual boost pressure Pb acquired in step S101. Specifically, the ECU 100 calculates the differential pressure ΔPb=Pbt−Pb between the target boost pressure Pbt and the actual boost pressure Pb. Then, based on the differential pressure ΔPb, the F/B term Svfb is calculated according to a predetermined map (not shown). When the differential pressure ΔPb is positive, i.e., when the actual boost pressure Pb is lower than the target boost pressure Pbt, a negative F/B term Svfb on a boost pressure increase-side is calculated. In contrast, when the differential pressure ΔPb is negative, i.e., when the actual boost pressure Pb is higher than the target boost pressure Pbt, a positive F/B term Svfb on a boost pressure decrease-side is calculated. Note that, when calculating the F/B term Svfb, a summed value of a P term, an I term and a D term corresponding to the differential pressure ΔPb is preferably used as the F/B term Svfb, according to a well-know n PID control method.

In step S106, the ECU 100 calculates a target variable vane opening degree Sv (=Svff+Svfb) by adding the calculated F/F term Svff and F/B term Svfb.

In step S107, the ECU 100 controls the opening degree of the variable vane 28 to the target variable vane opening degree Sv. That is, the turbo actuator 29 is controlled so that an actual opening degree of the variable vane 28 coincides with the target variable vane opening degree Sv.

In this way, the variable vane opening degree control is performed by a combination of F/F control by the F/F term Svff and F/B control by the F/B term Svfb. The F/F term Svff is a value that is a base of the target variable vane opening degree Sv, and is a value at which the target boost pressure Pbt car be substantially implemented in a current operating state of the engine. In the meantime, it is not possible to always implement the target boost pressure Pbt only with the F/F term Svff, because an actual operating state of the engine continues to change, for example. Therefore, the feedback term Svsb is added, and the variable vane opening degree is precisely controlled so as to stably implement the target boost pressure Pbt.

In the meantime, when increasing the actual boost pressure Pb toward the target boost pressure Pbt by decreasing the opening degree of the variable vane 28 (by narrowing the variable vane 28), the larger the differential pressure ΔPb is, the larger an absolute value of the F/B term Svfb is. In the meantime, when the abnormal wear of the contact parts 67 occurs, the differential pressure ΔPb increases as compared to a case where the abnormal wear does not occur, and the absolute value of the F/B term Svfb reaches the predetermined limit value so that the absolute value of the F/B term Svfb cannot be increased beyond the predetermined limit value. In this case, it is not possible to completely correct the differential pressure ΔPb with the F/B term Svfb, so that the actual variable vane opening degree and boost pressure becomes insufficient. In this case, the fuel injection amount increases relative to the intake air amount, so that the combustion gas temperature rises and the amount of NOx generation increases.

Figure 5:
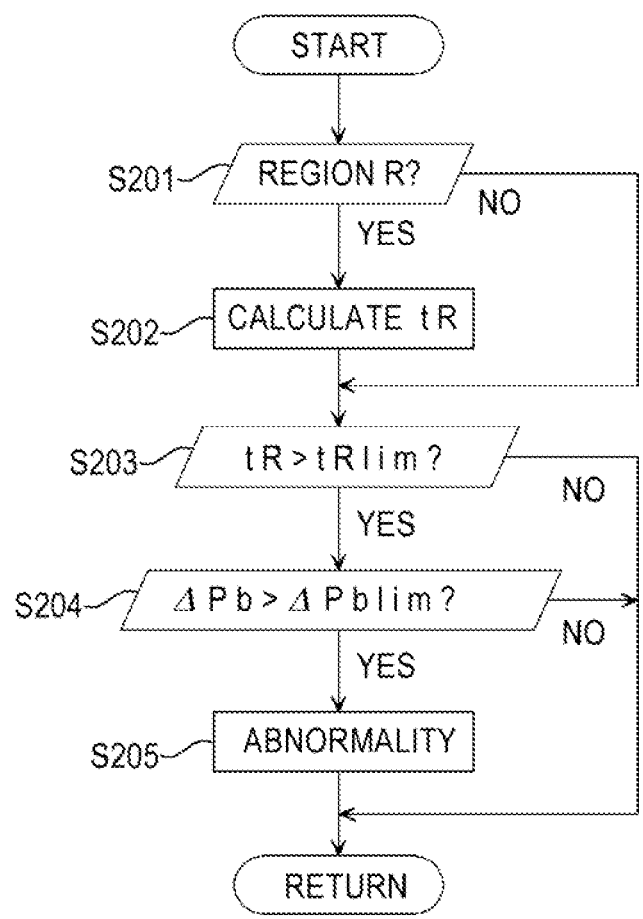
FIG. 5 is a flowchart depicting a routine of diagnosis processing.

Subsequently, the diagnosis processing is described with reference to FIG. 5. The shown routine is also repeatedly executed every predetermined calculation cycle τ by the ECU 100.

In step S201, the ECU 100 determines whether the operating state of the engine defined by the engine rotation number Ne detected by the rotating speed sensor 40 and the target fuel injection amount Q calculated in step S102 is in the wear promoting region R, based on the map of FIG. 3C.

When it is determined that the operating state of the engine is in the wear promoting region R, the ECU 100 proceeds to step S202, and calculates an operating time tR in the wear promoting region R by integration. That is, an operating time $tR_n$ in execution of this routine is calculated by adding or integrating the calculation cycle τ to an operating lime $tR_{n-1}$ in execution of previous routine ($tR_n = tR_{n-1} + \tau$). Then the ECU 100 proceeds to step S203.

On the other hand, when it is determined that the operating slate of the engine is not in the wear promoting region R, the ECU 100 skips over step S202 and proceeds to step S203.

In step S203, the ECU 100 determines whether the operating time tR calculated in step S202 exceeds a predetermined upper limit value tRlim.

When it is determined that the operating time exceeds the predetermined upper limit value, the ECU 100 determines in step S204 whether the differential pressure ΔPb calculated in step S105 exceeds a predetermined upper limit value ΔPblim.

When it is determined that the differential pressure exceeds the predetermined upper limit value, the ECU 100 determines that an abnormality has occurred in the link mechanism 50, particularly determines that the abnormal wear of the contact parts 67 of the operation arm 66 and the operation rotation piece 63 has occurred, in step S205. In this case, the ECU 100 activates a warning device (for example, a warning light, not shown) to urge the user to perform early inspection and maintenance. In addition, the ECU 100 stores a diagnosis code corresponding to the abnormality so that an abnormal place can be easily specified in later maintenance. In this way, the abnormality of the link mechanism 50 is promptly detected. After step S205, the routine is over.

On the other hand, when it is determined in step S203 that the operating time tR does not exceed the upper limit value tRlim, and when it is determined in step S204 that the differential pressure ΔPb does not exceed the upper limit value ΔPblim, the ECU 100 ends the routine.

As described above, according to the present embodiment, it is possible to promptly detect the abnormality of the link mechanism 50 of the variable geometry type turbocharger 14.

Although the embodiment of the present disclosure has been described in detail, other diverse embodiments of the present disclosure are also conceivable. For example, the operation rotation piece 63 and the rotation piece 59 as the rotation member may have another shape, for example, may have a polygonal shape other than quadrangular, such as a hexagonal shape.

The embodiment of the present disclosure is not limited to the above embodiment, and all modifications, applications and equivalents included in the spirit of the present disclosure defined in the claims are included in the present disclosure. Therefore, the present disclosure should not be construed in a limited manner, and can be applied to any other technology within the spirit of the present disclosure.

The subject application is based on Japanese Patent Application No. 2018-184212 filed on Sep. 28, 2018, the contents of which are incorporated herein by reference.

The diagnosis device for the internal combustion engine of the present disclosure is useful, in that it is possible to promptly detect the abnormality of the link mechanism of the variable geometry type turbocharger.

REFERENCE SIGNS LIST

1: internal combustion engine (engine)
14: turbocharger
14T: turbine
28: variable vane
29: turbo actuator
50: link mechanism
56: vane arm
59: rotation piece
61: contact part
63: operation rotation piece
66: operation arm
67: contact part
100: electronic control unit (ECU)
R: wear promoting region

The invention claimed is:

1. A diagnosis device for an internal combustion engine, the internal combustion engine including a variable geometry type turbocharger, and the turbocharger including a variable vane, a link connected and configured to operate the variable vane, and an actuator configured to drive the link, the diagnosis device comprising:

a control unit configured to control an opening degree of the variable vane by controlling the actuator, wherein the control unit determines that an abnormality has occurred in the link of the turbocharger when an operating time of the internal combustion engine in a predetermined operating region exceeds an upper limit value of the operating time and a differential pressure between a target boost pressure determined according to an operating state of the internal combustion engine and an actual boost pressure exceeds an upper limit value of the differential pressure, and wherein the predetermined operating region is an operating region in which a wear promotion of the link is determined to be dominant according to a test result.

2. The diagnosis device for the internal combustion engine according to claim 1, wherein the link includes a rotation member and a rotatable lever engaged to the rotation member and coupled to the rotation member, and wherein the abnormality of the link is abnormal wear at a contact part between the rotation member and the lever.

3. The diagnosis device for the internal combustion engine according to claim 1, wherein the link includes a rotation member and a rotatable lever engaged to the rotation member and coupled to the rotation member, and wherein the abnormality of the link is abnormal wear at a contact part between the rotation member and the lever.

* * * * *